United States Patent
Lindeman et al.

[11] 3,811,154
[45] May 21, 1974

[54] PANEL MOUNTING FASTENER

[76] Inventors: Richard Jay Lindeman, 2815 N. 72nd Ct., Elmwood Park, Ill. 60635; August Pestka, 1528 Grove Ave., Park Ridge, Ill. 60648

[22] Filed: Feb. 26, 1973

[21] Appl. No.: 335,629

[52] U.S. Cl. ............ 24/73 P, 85/5 R, 317/101 CC
[51] Int. Cl. .................. A44b 21/00, A44b 17/00
[58] Field of Search ............ 24/213 R, 208 A, 73 P, 24/73 PF, 73 PM, 73 PB; 85/5 R; 339/17 LM, 17 M; 317/101 D, 101 CC, 101

[56] References Cited
UNITED STATES PATENTS

| | | | |
|---|---|---|---|
| 3,123,389 | 3/1964 | Biesecker | 85/5 R X |
| 3,342,095 | 9/1967 | Buntic | 85/5 R |
| 3,393,350 | 7/1968 | Goudy et al. | 24/73 P |
| 3,568,263 | 3/1971 | Meehan | 24/73 P |
| 3,621,751 | 11/1971 | Fiorentino | 85/5 R |
| 3,631,738 | 1/1972 | Harper | 85/5 R X |
| 3,651,545 | 3/1972 | Hara | 85/5 R X |
| 3,704,486 | 12/1972 | Blacklock | 24/73 P |
| 3,707,108 | 12/1972 | Pabich | 85/5 R |
| 3,727,271 | 4/1973 | Znamirowski | 24/73 P |

Primary Examiner—Donald A. Griffin
Attorney, Agent, or Firm—J. R. Halvorsen; R. W. Beart

[57] ABSTRACT

A one-piece, rotatable plastic fastener for supporting the edge of at least one panel in spaced relation to an apertured support including positive snap retaining means for rotatable maintenance of the fastener in installed position in the apertured support with shelf-like flange means for supporting the edge of the panel in parallel spaced relation to the support and wing means for locking the panel against the flange.

7 Claims, 10 Drawing Figures

PATENTED MAY 21 1974　　　　　　　　　3,811,154

PANEL MOUNTING FASTENER

BACKGROUND OF THE INVENTION

In the electronics art, it is necessary to mount printed circuit boards relative to the chassis. Many devices have been proposed, most of which provide a mounting which is vertical relative to the chassis, however, it has been found that this type of mounting does not permit ready accessibility nor does it provide a simple means for connecting components on the printed circuit boards (hereinafter referred to as "P.C. boards") relative to other components mounted on the chassis. There have been suggestions previously made, but each of which fails to provide a simple means for hand installation by telescoping of a fastener with an apertured support and additionally, the previous means do not provide a means for take-up in tolerance variations in the thickness of the P.C. boards.

SUMMARY OF THE INVENTION

The present invention has as an object the provisions of a one-piece rotatable plastic fastener which can be axially telescoped into an apertured support as well as the provision for means for spacing a shelf-like flange above said support, the flange being adapted to serve as a shelf to accept the edge of a printed circuit board laid thereon with rotation of the fastener bringing into play overlying wing means which will grip the P.C. board between the shelf-like flange and the wing member.

A further object of the invention is to provide a means for accepting the edge of a panel as opposed to an aperture in the panel thereby providing, with multiple wings on the fastener, the possibility of mounting two panels in side-by-side spaced relation.

Still another object of the present invention is to provide a simple, one-piece plastic fastener which can be injection molded in an economical two-plate mold.

Further objects of the invention will be apparent to those skilled in the art when the specification is read in conjunction with the accompanying drawing.

Figure 1:
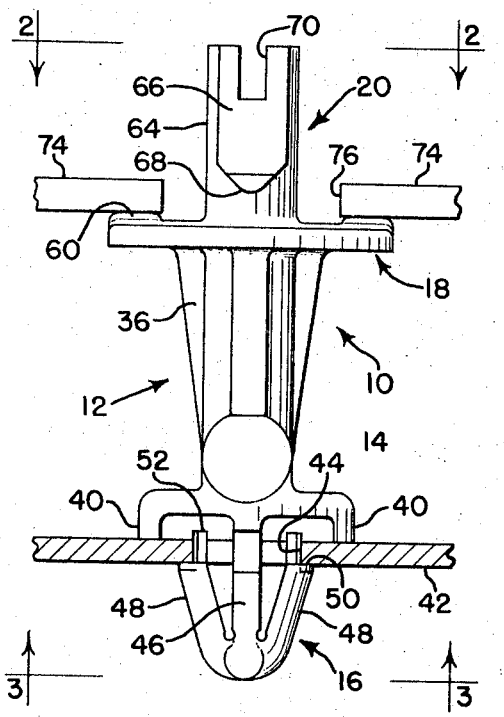
FIG. 1 is a vertical elevation of one embodiment of the present invention in its initial installed position.

Referring now more specifically to the drawings wherein similar parts are designated by similar numerals, a fastener 10 includes a central body portion 12, flange means 14 extending outwardly from the lower end, as seen in FIG. 1, a resilient stud means 16, a second shelf-like flange means 18 and one or more locking means 20 projecting laterally in spaced relation to the flange 18 for gripping a secondary panel.

The axially extending body 12 is substantially rigid and serves as a spacer means. In this embodiment, it includes a generally cruciform column 30, a reinforcing cylinder 32, and a pair of tapering gussets 34 which extend from the extremities of the cylinder 32 and taper inwardly and upwardly toward the column 30. Disposed at 90° from the gussets 34 are a pair of reinforcements 36 which have the opposite taper from the gussets 34.

At the lower extremity of the column 30 is a laterally extending flange means 14. The flange 14 in this embodiment may include a generally circular configured central portion 38 and a pair of downwardly extending feet 40 adapted to engage the upper surface, as viewed in FIG. 1, of the support panel 42 having a generally circular aperture 44 therethrough. It will be noted that the flange 14 is reinforced by the cylindrical portion 32 at a point approximately 90° offset from the feet 40 thereby making the flange most resilient when pressure is applied against the feet 40 for purposes best set forth hereinafter.

Figure 4:
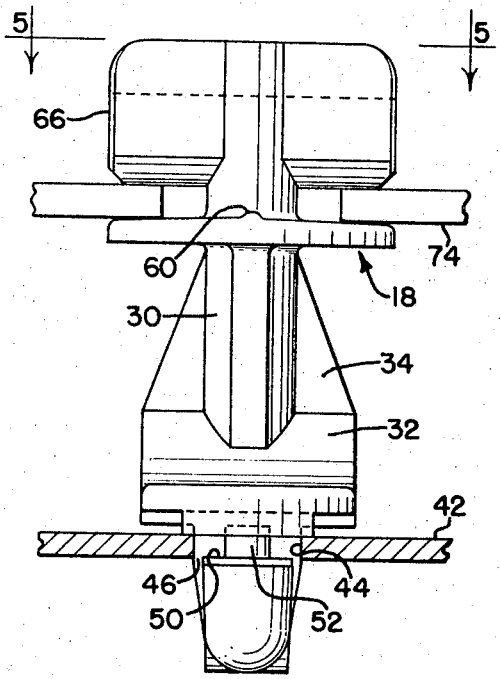
FIG. 4 is an elevational view of the embodiment of FIG. 1; after it has been rotated 90°.
Figure 2:
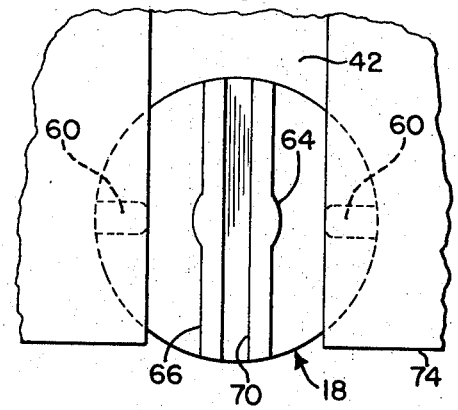
FIG. 2 is a vertical plan view of the embodiment of FIG. 1 as taken along line 2—2 of FIG. 1.
Figure 5:
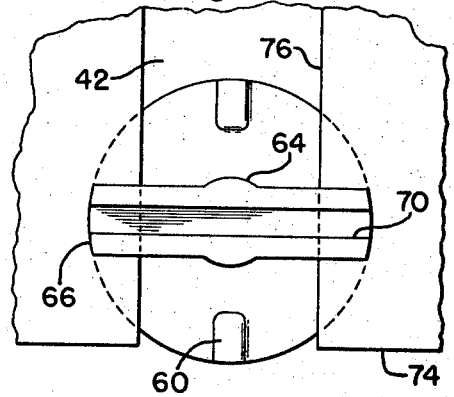
FIG. 5 is a plan view from the top end of the embodiment shown in FIG. 4 taken along line 5—5.
Figure 3:
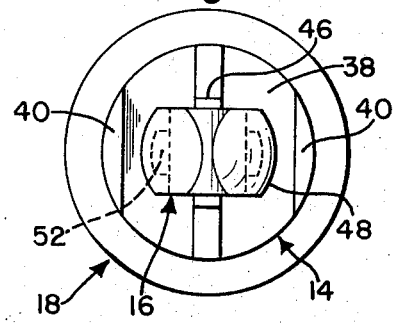
FIG. 3 is a bottom end view of the embodiment shown in FIG. 1 prior to installation and as viewed along line 3—3 of FIG. 1.

Extending downwardly from the flange 14 is a resilient stud means 16. In the present embodiment, thus stud means includes a central rigid portion 46 generally rectangular in cross-section which tapers inwardly toward its free extremity. Connected to the free extremity of the central portion 46, are a pair of resilient legs 48 which terminate in a shoulder 50 which is opposed and spaced from the free extremity of feet 40 a distance substantially equal to the thickness of the support 42. Extending upwardly from the shoulders 50 are a pair of guide or locating tabs 52 which engage the side wall of the aperture 44 to limit the lateral distention of the legs 48 under axial pressure. It will be noted from FIG. 4 that the upper width of the central rigid portion 46 may be substantially equal to the diametral measurement of aperture 44 to serve as a locating and shear means. Similarly, the legs 48 may be curvilinear in cross section to assist in their telescopic association with aperture 44. The broad extent of shoulder 50 provides a positive engagement with the underside of panel 44 which insures positive retention against retrograde movement. At the upper extremity of the column 30 there is positioned a second shelf-like flange 18. The flange 18 is generally circular in configuration and is supported on its underside by the rib 36. Falling in the same axially disposed plane as the rib 36 are a pair of protuberances 60 disposed radially on the upper surface of the flange 18. It will be noted that the flange 18 is generally more rigid in this plane than in an axial plane disposed perpendicular thereto.

Extending axially beyond the flange 18 is a rigid extension 64 carrying one or more laterally extending wings 66 having a tapered or cammed lower surface 68 and, if desired, a kerf 70 of suitable configuration for acceptance of a tool means to induce rotation of the fastener.

Such a fastener is preferably injection molded from a plastic material such as nylon or any other suitable material which will provide flexibility in thin sections and rigidity in heavier sections.

Figure 10:
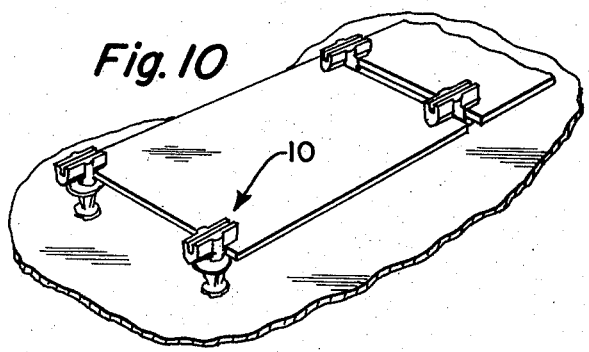
FIG. 10 is a perspective view in partial section of an installation utilizing the embodiments of this invention.

The fastener is preferably telescoped with an aperture 44 until the shoulders 50 are in engagement with the underside of panel 42 and the foot means 40 engaging the upper surface. The flange 14 will flex to accept tolerance variations in the panel thickness. A panel 74 can then be laid to rest on the upper surface of flange 18 against the protuberance 60. The fastener is then rotated either by gripping the wing 66 in the operator's fingers or alternatively, through use of a tool engaging the kerf 70. The cam surface 66 will ride up over the edge 76 of the panel 74 until it overlies the upper side. It will be remembered that the reinforcing means 36 is disposed under the protuberance 60 thereby making the flange 18 more flexible in a plane disposed at 90° thereto whereby the spacing between the cam surface 68 and the upper surface of the flange 18 will accommodate tolerance variations in the thickness of the panel 74, the normal spacing between the cam surface 68 and the flange 18 being equivalent to or slightly less than the close tolerance thickness of panel 74. Additionally, the protuberances 60 serve as a stop against unintentional retrograde rotation of the fastener 10. As seen in FIG. 10, the fastener can be utilized to grip the edge of a single panel 74 or can be utilized to grip a pair of adjacent panels 74. It will be appreciated that either a single wing 66 or a double wing can be utilized as will suit the need of a particular application. Similarly, the edge of the board 74 can be mounted on a flange with the opposite free edge supported and gripped in position by a fastener 10.

Figure 6:
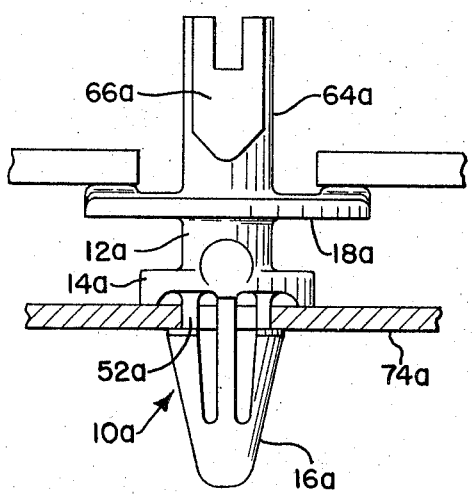
FIG. 6 is an elevational view of a second embodiment of the present invention shown in installed position.
Figure 7:
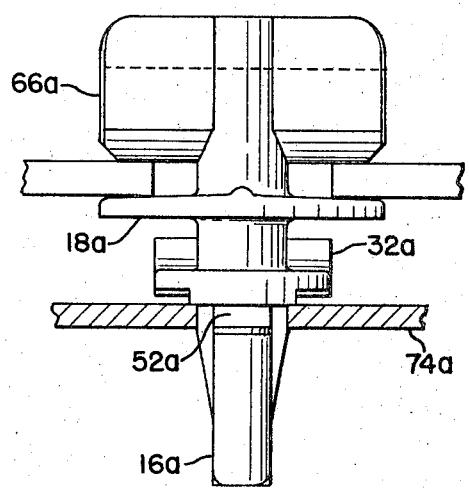
FIG. 7 is an elevational view of the device shown in FIG. 6 after it has been rotated 90°.

Referring now to FIGS. 6 and 7 wherein similar numerals will be utilized to identify similar parts with the addition of the suffix "a," the fastener 10a includes a rigid central body portion 12a, a pair of spaced flanges 14a and 18a and an upper extension 64a and laterally extending wings 66a. The major difference between the present fastener and the first embodiment is in the configuration of the stud 16a. In this embodiment, the extensions 52a are not free, but rather extend upwardly and are made integral with the underside of flange 14a. It has been found in certain applications that the additional stiffness in the studs 16a is desirable. The function and operation of this fastener is substantially identical to that in the first embodiment.

Figure 8:
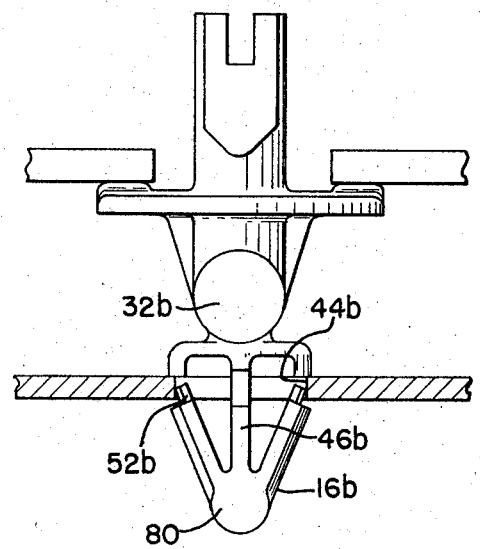
FIG. 8 is an elevational view of still another embodiment of the present invention shown in installed position.
Figure 9:
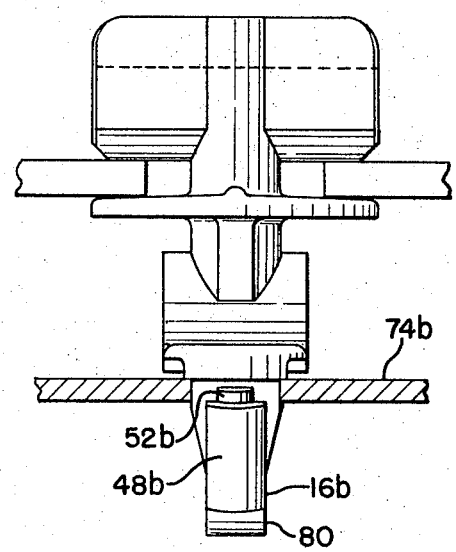
FIG. 9 is an elevational view of the embodiment shown in FIG. 8 after it has been rotated 90°.

Referring now to FIGS. 8 and 9, wherein similar numerals will be utilized to designate similar parts with the addition of the suffix "b," we here again find a difference only in the stud configuration. In this embodiment, the resilient stud 16b includes a generally cylindrical nose portion 80 disposed at the free end of the central rigid portion 46b to provide a wide variation take-up in the diametral dimension of the aperture 44b. The extensions 52b are free, as in the first embodiment, but have their free end engaging the side wall of the aperture 44b rather than their own side wall.

It will be apparent from the foregoing that this invention contemplates a simple, one piece plastic fastener which can be readily assembled with a support panel that will provide a directional resilience to the lower flange in opposition to the snap fastener, primarily to accommodate tolerance variations in the support as well as to insure engagement of the shoulder means with the undersurface of the panel for retention purposes. The upper extremity of the fastener, as viewed in the drawings, permits ready assembly of a printed circuit board with adjacent components, such as sockets, in a chassis, and insures an insulated or dielectric mounting for a P.C. board in spaced parallel relation to the chassis or other support means, but permits ready removal by intentional retrograde rotation of the fastener. Other forms will certainly be apparent to those skilled in the art.

I claim:

1. A fastener assembly for mounting at least one panel in generally parallel spaced relation to an apertured support, including an apertured support, at least one rotatable plastic fastener, and at least one panel presenting an edge for engagement by said fastener, said rotatable fastener including a central substantially rigid body portion, a pair of radially extending flanges being disposed adjacent opposite ends of said body portion, stud means extending axially out from said body portion beyond one of said flange means and having shoulder means in spaced opposition to said one flange means, an extension to said body projecting axially beyond said second flange means oppositely from said stud with said extension having at least one rigid radially extending wing spaced from and overlying said second flange means, reinforcing means carried by said body and stiffening said flange means with the first mentioned flange means being resiliently flexible along one plane falling on the axis of the fastener while the second mentioned flange means being resiliently flexible along a second plane disposed on the axis of the fastener, said second plane being substantially normal to said first plane, said wing and said shoulder means in the stud being oriented to the more flexible portions of said flange means, said second mentioned flange means being generally circular in configuration to provide a shelf-like member on which the edge of said panel can be supported, with the edge initially being free of said wing, rotation of the fastener resulting in a snug gripping of said edge between said wing and said second flange means with variations in panel thickness being accommodated by flexure of said second flange means and detent means carried by said flange adapted to cooperate with said edge and prevent unauthorized retrograde rotation of said fastener.

2. A one-piece plastic rotatable fastener for mounting at least one panel in spaced relation to a support including a central body portion, flange means extending radially outwardly from adjacent opposite ends of said body portion, resilient stud means extending axially from one end of said body portion and having shoulder means spaced from and in opposing relation to one of said flange means and adapted to be snapped into an apertured support means with said shoulder means engaging one face of said support means while said one flange means resiliently engages the opposite face thereof, said stud means adapted to be positively axially retained against inadvertent removal but capable of rotation therein, said body portion being a substantially rigid columnar member supporting said flange means adjacent opposite ends thereof and integral reinforcing means extending from said body portion and engaging said first mentioned flange means against flexing in a plane disposed along the axis of said body portion but permitting axial deflection in a second axially extending plane generally disposed at a right angle to the first mentioned plane, the shoulder means of said stud being generally disposed in said second plane whereby said fastener is capable of being resiliently retained within a wide tolerance of thickness in said support, said body portion extending axially beyond said other flange means at the end opposite said stud and carrying a pair of substantially rigid wing elements extending radially outwardly in opposite directions in overlying spaced relation to said other flange means, each wing element having its lower edge provided with a cammed surface facing said other flange, the body portion and wings including a tool engaging means to facilitate rotation, whereby a panel placed on said flange can be retained in place by rotation of said fastener to position at least one of said wing elements in overlying arrangement to grip said panel between the wing element and the adjacent opposed portion of the resilient other flange means.

3. A fastener of the type claimed in claim 2 wherein said other flange means is supported by said body reinforcing means located substantially in said second plane and said other flange means is more resiliently flexible in the first mentioned plane whereby the general lines of greatest flexure of said flange means are disposed at substantially right angles to one another.

4. A fastener of the type claimed in claim 3 wherein said wing elements are disposed in opposition to the surface of greatest flexure in said other flange and further having locking detent means projecting upwardly from its surface in the plane of said reinforcing means.

5. A fastener of the type claimed in claim 4 wherein said wing elements are spaced from said flange a distance equal to or less than the thickness of said panel, when said panel edge is initially disposed in the upper surface of said flange in a position generally aligned with said wing elements and the wing elements with the rest of the fastener are rotated ninety degrees within the support, the cam surfaces under the wings ride up the edge of the panel depressing the said other flange to aggressively retain the panel.

6. A fastener of the type claimed in claim 2 wherein said stud means includes a central rigid post element and a pair of outwardly diverging leg elements which carry at their free end said shoulder means in opposition to the first mentioned flange means, each of said legs carrying an offset locating means adapted to abut the margins of said aperture while said shoulder means underlie said support means.

7. A fastener of the type claimed in claim 6 wherein said locating means extend upwardly to and are connected to the underside of said first mentioned flange means.

* * * * *